June 26, 1928.
I. P. PEDIGO
ANIMAL SHEARS
Filed July 11, 1927
1,674,659
2 Sheets-Sheet 2
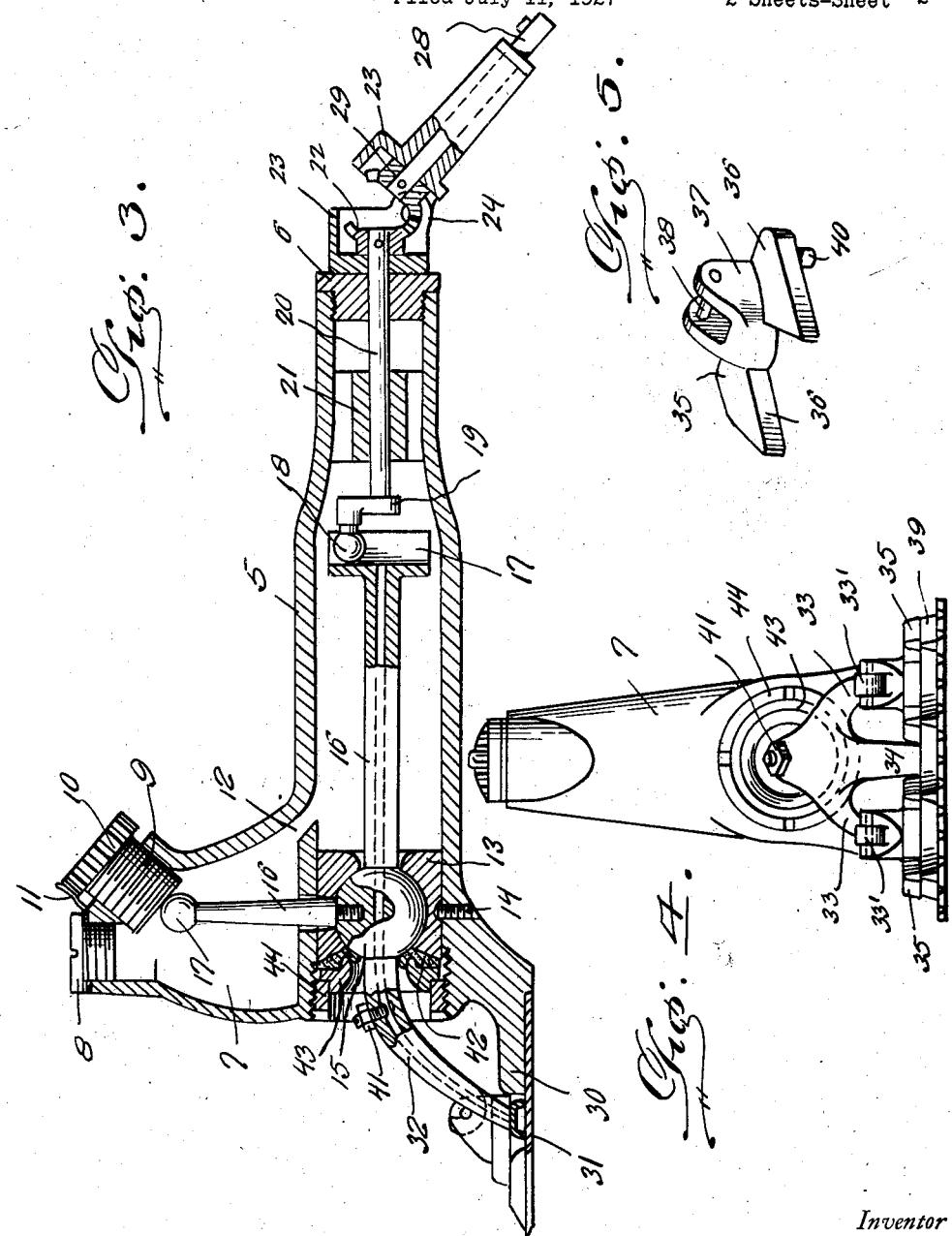
Inventor
Ira P. Pedigo,
By Clarence A. O'Brien
Attorney Patented June 26, 1928.

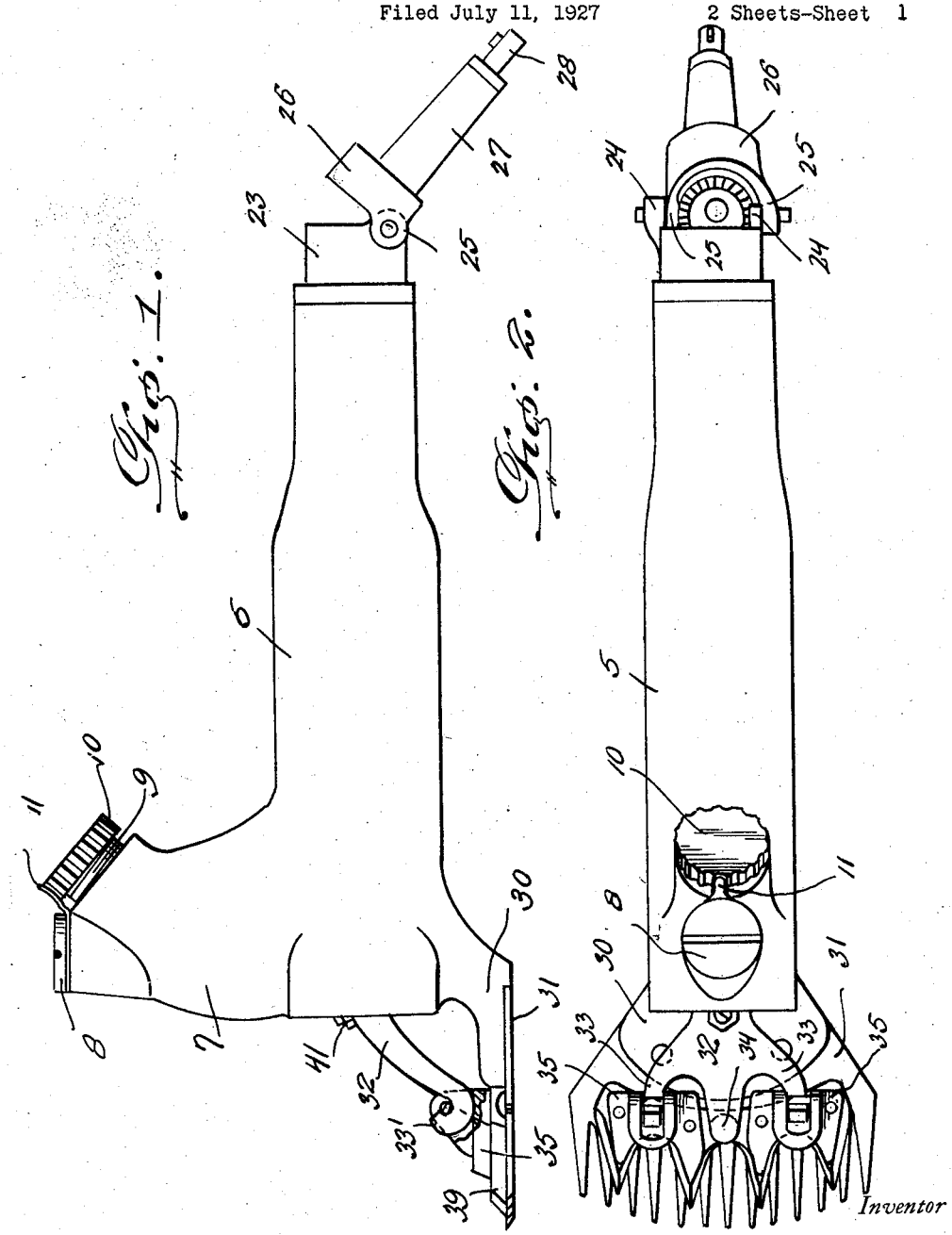

1,674,659

UNITED STATES PATENT OFFICE.

IRA PULASKI PEDIGO, OF WACO, TEXAS.

ANIMAL SHEARS.

Application filed July 11, 1927. Serial No. 204,883.

This invention relates to new and useful improvements in animal shears and has for its main object to provide a lubricating chamber for association with the forward end portion of the hollow stem or handle of the shears.

A further object is to provide an animal shears, wherein a bearing is provided for the ball shaped head carried by the forward end of the stem that extends longitudinally in the handle.

To the attainment of this end there is provided means for permitting the movable blade of the shears to be removed and also to cause the same to have close wiping engagement with the stationary blade during the reciprocation of the movable blade. Furthermore, simple, and efficient and replaceable means is provided for preventing the leakage of oil through the forward end of the hollow stem or handle of the shears.

With the foregoing and other objects in view as the nature of the invention will be better understood, the same comprises the novel form, combination and arrangement of parts hereinafter more fully described, shown in the accompanying drawings and claimed.

In the accompanying drawings forming part of this application and in which like numerals indicate corresponding parts:

Figure 1 is a side elevation of my improved animal shears.

Figure 2 is a top plan view thereof.

Figure 3 is a detail longitudinal section.

Figure 4 is a front end elevation, and

Figure 5 is a perspective of one of the movable blade securing elements of the shears that also acts as a weight upon the movable blade to maintain the same in close sliding engagement with the stationary cutter blade.

Now having particular reference to the drawing there is disclosed an animal shears therefore, that includes a hollow stem or handle 5 open at its forward end and provided at its rearmost end with a closure plug 6, preferably threaded into the stem or handle as clearly indicated in Figure 3. Formed upon the forward end of this stem or handle 5 is a vertically extending lubricant chamber 7 having a threaded opening in its upper end for receiving a filler plug 8. Furthermore the upper end of this chamber is formed in back of the filler opening with a diagonally extending opening to receive a threaded plug 9 having a knurled thumb nut 10 at the outer end thereof for cooperation with a spring member 11 for maintaining the threaded plug in predetermined adjusted positions within the opening. The lubricant chamber 7 has communication with the hollow stem or handle by reason of a small opening 12 at the back wall of said chamber, see Figure 3. Removably disposed within the forward end of the stem or handle 5 beneath the bottom wall of the lubricant chamber 7 is a sectional block 13 which is retained within the stem or handle by a set screw 14 threaded upwardly through an opening in the bottom wall of the stem and engaging at its inner end within a notch in the bottom wall of said sectional block, see Figure 3.

The sectional block 13 is formed centrally to receive a bearing ball 15 the top side of which is provided with a threaded socket for receiving the lower threaded and reduced end of a vertically extending stem 16 that projects upwardly through a flared opening in the top of the block 13 in registration with which is an opening in the bottom wall of said lubricant chamber 7. The upper end of this stem 16 is provided with a loosely attached ball 17 that is engaged by the threaded plug 9 so that when the plug is adjusted within the opening of the lubricant chamber the ball is caused to turn within a longitudinal plane for adjusting the movable cutter in a manner hereinafter more fully described.

The rear side of the sectional block 13 is provided with a flared opening through which projects a shaft 16 the inner end of which is attached to said ball 15 while the rear end thereof carries a vertically slotted head 17 within which is movable a ball 18 upon a crank 19 at the inner end of a short drive shaft 20 which is supported within a horizontal bearing 21 within the rear end of the stem or handle 5. This drive shaft 20 extends through a central opening in the plug 6 while the extreme outer end thereof is equipped with a beveled gear 22. Arranged between the plug 6 and said gear 22 is a collar 23 open at its lower side, said collar being formed at opposite sides of the opening with pivot ears 24—24. Pivoted to these ears are similar ears 25—25 formed integrally with a somewhat similar collar 26 that is in turn formed upon the inner end of a short guide sleeve 27. Rotatably mounted within this sleeve 27 is a driven shaft 28, the inner end thereof being equipped with a beveled gear 29 having mesh with the gear 22. The connection between the shafts 28 and 20 is obviously a universal joint so that the shears proper may be turned at any angle with respect to the shaft 28 which shaft is driven by an electric motor or other suitable power means.

At the forward end of the stem or handle 5 the bottom wall thereof is provided with downwardly offset and forwardly extending horizontal tongue 30 to the bottom surface of which is connected a stationary blade 31 that projects forwardly of said tongue as clearly indicated in Figures 1, 2 and 3. The outer edges of the tongue and stationary blade are of rounded contour as clearly disclosed in Figure 2. Projecting outwardly of the stem or handle 5 and being attached to the sectional block carrying ball 15 is a forwardly and downwardly extending arm 32 the outer end of which is provided with three equally spaced fingers 33—33 and 34, the central finger 34 extending beneath the ends of the fingers 33—33 as clearly disclosed in Figures 1, 3 and 4. The ends of the fingers 33—33 are formed with upwardly bent hooks 33'—33' while removably pivotally supported thereon are movable blade retaining and tension members 35—35. Each tension member consists of a pair of spaced horizontal wings 36—36 of general triangular formation being integrally joined at their rear edges by a vertically projecting relatively U-shaped attaching bracket 37 between the sides of which is arranged a pivot pin 38 for engagement over the respective hook 33' of the arm finger 33. Arranged beneath these tension members 35—35 and movable upon the top surface of the stationary cutter 31 is a reciprocating cutter blade 39 of generally conventional design, the said cutter blade 39 being formed with spaced openings for receiving depending pins 40 carried by each of the wings 36—36 of said tension members 35—35. The central finger 34 of the arm 32 is provided for firm engagement with the cutter blade 39 between said elements 35—35 as clearly disclosed in Figures 3 and 4. Obviously said finger 34 as well as the tension members 35—35 serve to maintain the movable cutter blade 39 in relatively firm engagement with the stationary blade 39 and this throughout its entire length so that a proper cutting action willl be had during the reciprocation of said movable blade.

The ball 15 is formed centrally with a longitudinally extending passage having registration with bores in the shaft 16 and arm 32, the passage in the arm 32 extending throughout the central finger 34 so that lubricant will be conveyed to the movable blade for obviously lubricating the surfaces between the stationary and movable blade. In this instance also a suitable control screw 41 is provided for association with the arm 32, see Figures 3 and 4.

In order to prevent the lubricant from escaping past the sectional block 13 and through the forward end of the stem or handle 5, said forward end of the stem or handle is screw threaded as disclosed in Figure 3. A suitable packing 42 is disposed against the dished forward face of the sectional ball block 13, said packing being open at its center to permit the arm 32 to pass therethrough. A lead babbitt or other soft metallic packing gland 43 of sectional formation is then arranged within the forward end of the stem or handle against the packing 42, the center of this gland being provided with a large flaring opening to permit the proper movement of the movable blade actuating arm 32. This gland 43 is flanged as indicated in Figure 3 and for retaining said gland in tight engagement with the packing 42 there is provided a ring 44 threaded within the forward end of the stem or handle and of such an area as to engage around the gland 43 and have contact with the flange thereof as clearly disclosed.

While I have shown the preferred embodiment of my invention, it is to be understood that various changes in the shape, size, and arrangement of parts may be resorted to, without departing from the spirit of the invention or the scope of the appended claims.

Having thus described the invention, what I claim as new and desire to secure by Letters Patent is:—

1. In an animal shearing device of the character described, a hollow handle open at its opposite end, a lubricant chamber arranged upon the top of the handle at the forward end thereof and having communication with the handle at the bottom and back side thereof, a stationary cutter blade secured to the forward end of said handle and projecting beyond said end, a sectional block arranged within the handle beneath said lubricant chamber, a ball arranged for rocking movement within said block, a shaft associated with the rear of the ball and projecting through said block, means whereby said shaft may be rocked, an arm projecting forwardly from the ball through the front side of said block and extending downwardly adjacent said stationary blade, a movable cutter blade disposed upon the stationary blade and operatively associated with the outer end of said arm and ring-like packing means removably located within the forward end of said handle and having engagement with the front side of said sectional block.

2. In an animal shearing device of the character described including a hollow handle open at its forward end, a stationary cutter blade projecting forwardly from the front end of said handle, a movable blade arranged for reciprocatory movement upon the upper surface of the stationary blade, a sectional block arranged within the forward end of the handle, a ball mounted for rocking movement within said block, means associated with the back side of said ball projecting through the block whereby the ball may be rocked, an arm projecting forward from the ball and extending downwardly for attachment to said stationary blade, an oil chamber arranged at the top of the handle adjacent the forward end thereof and communicating with the interior of the handle in back of said block, and removable packing means arranged within the forward end of said handle surrounding said arm and having close engagement with the front side of said block.

In testimony whereof I affix my signature.

IRA PULASKI PEDIGO.